(12) United States Patent
Giles (10) Patent No.: US 11,358,256 B2
(45) Date of Patent: Jun. 14, 2022

(54) FIXTURE CLAMP MANIFOLD APPARATUS AND SYSTEM FOR USING

(71) Applicant: David Giles, Clinton, MI (US)

(72) Inventor: David Giles, Clinton, MI (US)

( * ) Notice: Subject to any disclaimer, the term of this patent is extended or adjusted under 35 U.S.C. 154(b) by 0 days.

(21) Appl. No.: 17/095,442

(22) Filed: Nov. 11, 2020

(65) Prior Publication Data

US 2022/0143785 A1 May 12, 2022

(51) Int. Cl.
*B25B 5/16* (2006.01)
*B23Q 11/12* (2006.01)

(52) U.S. Cl.
CPC ............... *B25B 5/16* (2013.01); *B23Q 11/12* (2013.01)

(58) Field of Classification Search
CPC .... B25B 5/16; B25B 5/00; B25B 5/04; B25B 5/062; B25B 5/087; B25B 5/061; B25B 1/00; B25B 1/2426; B25B 3/00; B23Q 11/10; B23Q 11/12; B23Q 11/122; B23Q 11/02; B23Q 11/005; B23Q 11/0875; B23Q 3/08; B24B 55/02; B23B 29/26; Y10T 407/14; Y10T 408/44; Y10T 279/17111; Y10T 408/6757; Y10T 82/2587; B23C 5/28; B23C 2250/12; Y10S 29/092
USPC .................. 269/24, 27, 32, 228, 20; 407/11; 408/56, 61, 57, 60, 130; 29/DIG. 60, 92; 83/168, 169
See application file for complete search history.

(56) References Cited

U.S. PATENT DOCUMENTS

| | | | | |
|---|---|---|---|---|
| 5,779,408 A * | 7/1998 | Amodeo | ............... | B23Q 11/10 408/137 |
| 6,299,388 B1 * | 10/2001 | Slabe | ............... | B23B 27/10 407/100 |
| 7,762,166 B2 * | 7/2010 | Giannetti | ............... | B23Q 11/10 82/50 |
| 9,101,985 B2 * | 8/2015 | Chen | ............... | B23B 27/10 |
| 2010/0052233 A1 * | 3/2010 | Karras | ............... | B25B 5/061 269/24 |
| 2019/0030687 A1 * | 1/2019 | Zanni | ............... | B25B 5/062 |
| 2019/0184467 A1 * | 6/2019 | Nagae | ............... | B23B 29/12 |
| 2019/0224794 A1 * | 7/2019 | Luthi | ............... | F15B 13/024 |

* cited by examiner

*Primary Examiner* — Tyrone V Hall, Jr.
*Assistant Examiner* — Craig Crowell Baker
(74) *Attorney, Agent, or Firm* — Donald J. Lecher; Butzel Long (57) ABSTRACT

A clamp and manifold apparatus comprising internal fluid-flow passages and such apparatus in a system. One embodiment of the apparatus of the invention comprises a clamp body; a manifold, an attachment feature for attaching to a fixture system; a clamping surface; at least one fluid flow passage inside the manifold having at least two endpoints; a first port disposed adjacent to the manifold and in fluid communication with one endpoint of the at least one fluid flow passage inside the manifold; and, a second port disposed adjacent to a second surface of the manifold in fluid communication with the second endpoint of the at least one fluid flow passage inside the body. An embodiment of the system of the invention comprises said clamp and manifold; a fixture; a fluid distribution pump; and fluid routing means connecting the fluid distribution pump and the first port of the apparatus of the system.

20 Claims, 6 Drawing Sheets

FIXTURE CLAMP MANIFOLD APPARATUS AND SYSTEM FOR USING

FIELD OF THE INVENTION

The present invention relates generally to a tool used in machining, assembly, and other manufacturing operations. More particularly, the invention relates to a clamp and manifold apparatus and fixture system configured to direct a working fluid in a predetermined direction that may aid in cutting, clearing, cleaning or some other machining, assembly, or manufacturing operation.

BACKGROUND

Clamps may be used to hold workpieces in place, sometimes in conjunction with a fixture, during machining, assembly, or other manufacturing operations. Fluids and gases, such as coolant, compressed air, nitrogen, carbon dioxide, cutting oils, cutting fluids, chemicals, glues, multipart epoxies, adhesives, coatings, sealants, paints, as examples, or other fluids or gases may be dispersed via hand-held, semi-automated, or automated means or other devices to aid in cutting, clearing, cleaning, cooling, etching, bonding, coating, or some other machining, manufacturing, or assembly operation.

DETAILED DESCRIPTION

The embodiments presented herein provide a novel consolidation of clamp features, fixture features, and fluids or gases dispersion features, which may further be used in conjunction with a novel configuration of the same within a system.

In one embodiment, a manifold and clamp assembly includes a manifold 3, with or without nozzles 4, integrated or connected to an unpowered or hydraulically, pneumatically, or electrically powered clamp 2, the manifold 3 configured for porting fluids or gases to a point of use on a fixture 7 or device to which the clamp 2 is attached. The manifold 3 can be attached to a clamp head 2 using a screw, bolt, rivet, bracket 12 or other means for attaching components known in the art of powered or unpowered work holding clamps, machining, and fabrication and manufacturing at a designated attachment point 14 on the manifold 3, or built integral to an integral clamp head and manifold 18, (see FIG. 6), at the time of its manufacture. The manifold 3 having a first fluid entry port 11 and a second fluid exit port 13, and/or an internal fluid flow passage 17 that allows the direction and distribution of fluids or gases toward a fixture or work holding apparatus 7 to which the clamp is attached or a workpiece 6 held by the clamp 2. In another embodiment a clamp and manifold system 1 includes a clamp 2 and manifold 3 apparatus 5 comprised of a clamp head 2, a clamp body 30, a fixture or work holding apparatus 7 to which the clamp head 2 may be attached at an attachment feature 22, and a manifold 3 that is mountable to the head of an unpowered or a pneumatic, hydraulic, or electrically driven rotary, swing, or pivot clamp 2. In such an embodiment, the manifold 3 includes at least one internal fluid flow passage 17, and at least a first fluid entry port 11, the first fluid entry port 11 disposed adjacent to the manifold 3 and in fluid communication with a first endpoint 15 of the at least one fluid flow passage 17 inside the manifold 3, and a second fluid exit port 13, the second fluid exit port 13 disposed adjacent to the manifold 3 and in fluid communication with a second endpoint 16 of the at least one fluid flow 17 inside the manifold 3. The manifold's passages in fluid communication for flow of a fluid to an area of a clamped workpiece 6 or other object, or to the fixture 7 to which the workpiece 6 is clamped. The system may be configured such that the manifold 3 is configured with a nozzle 4 or other element known in the art of direct fluid flow from a port to aid in cutting, in clearing material from a cut, for cleaning the fixture 7, the clamp 2, workpiece resting surface 10, or clamp head surfaces, for cleaning a clamped object or workpiece 6, for cooling a workpiece 6, an external or integrated tool, or clamping surface 27, or for applying a chemical, coating, spray, adhesive or other substance 9 to a workpiece 6. Such examples of other elements known in the art of directing fluid flow may include tubes or pipes fitted with a connector on a first end and an open-ended nozzle, a user-operated nozzle, a sprayer, or other fluid dispersion device.

Figure 1:
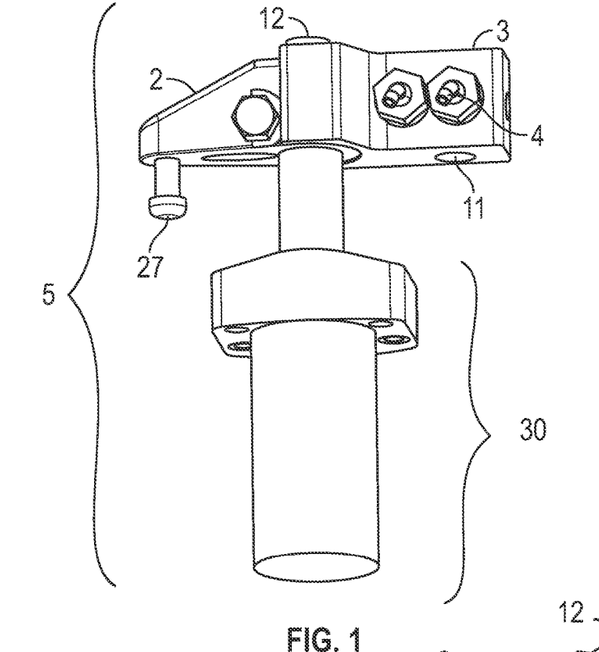
FIG. 1 is a side-perspective view of a clamp and manifold apparatus embodiment configured in an unclamped position.
Figure 2:
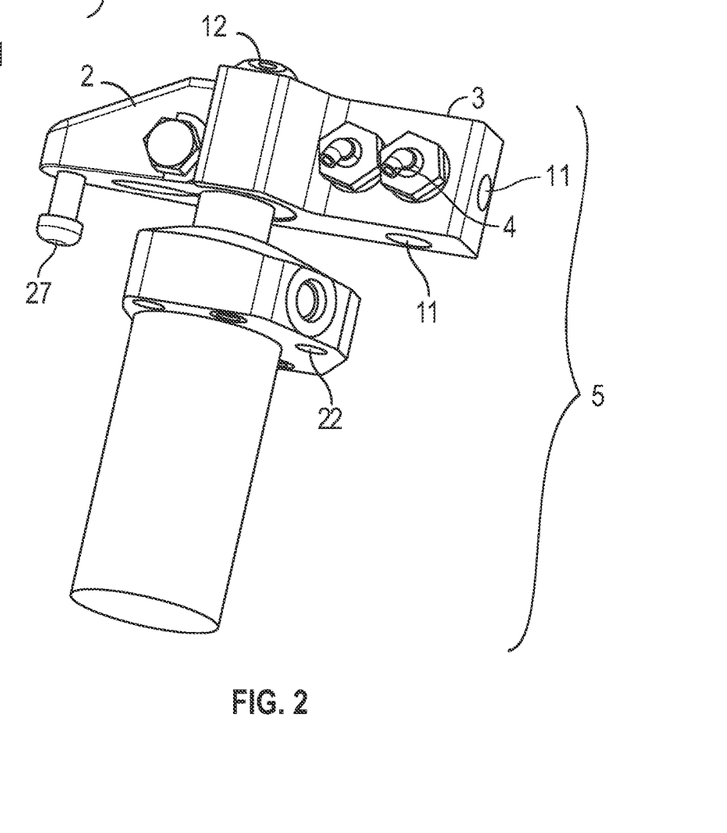
FIG. 2 is a side-perspective view of a clamp and manifold apparatus embodiment configured in a clamped position.
Figure 3:
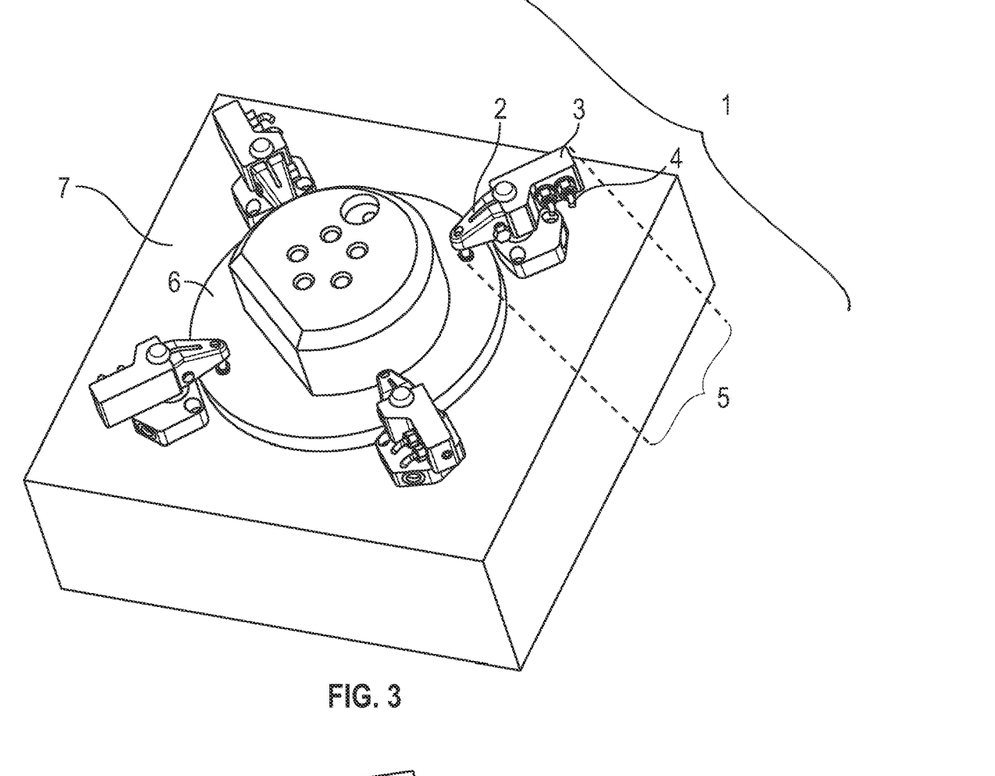
FIG. 3 is a side-perspective view of a clamp fixture system embodiment having four clamp and manifold apparatus embodiments configured in a clamped position having a workpiece.
Figure 4:
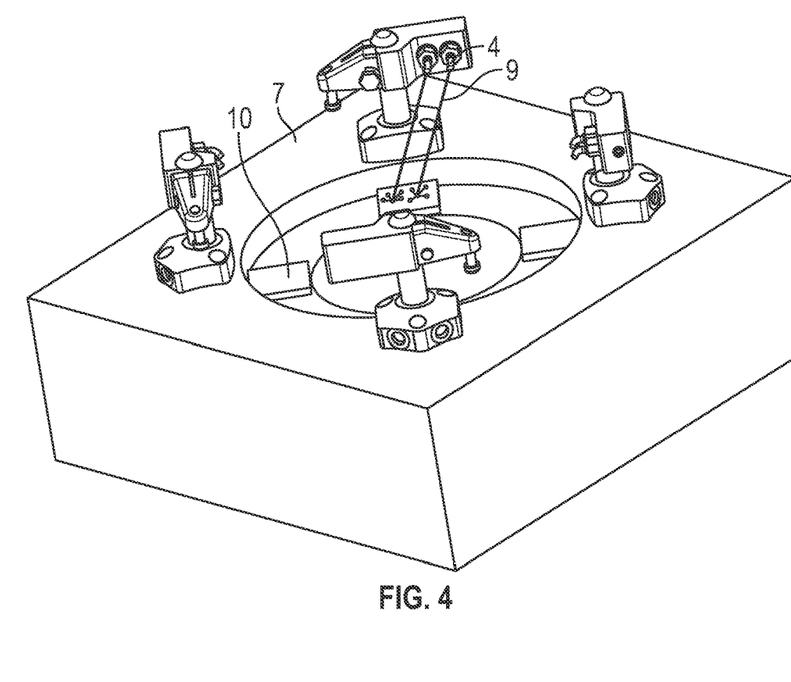
FIG. 4 is a side-perspective view of a clamp fixture system embodiment having four clamp and manifold apparatus embodiments configured in an unclamped position without a workpiece and further showing an embodiment wherein the clamp and manifold apparatus are configured to direct a working fluid of the system of an embodiment to a surface of the system.
Figure 5A:
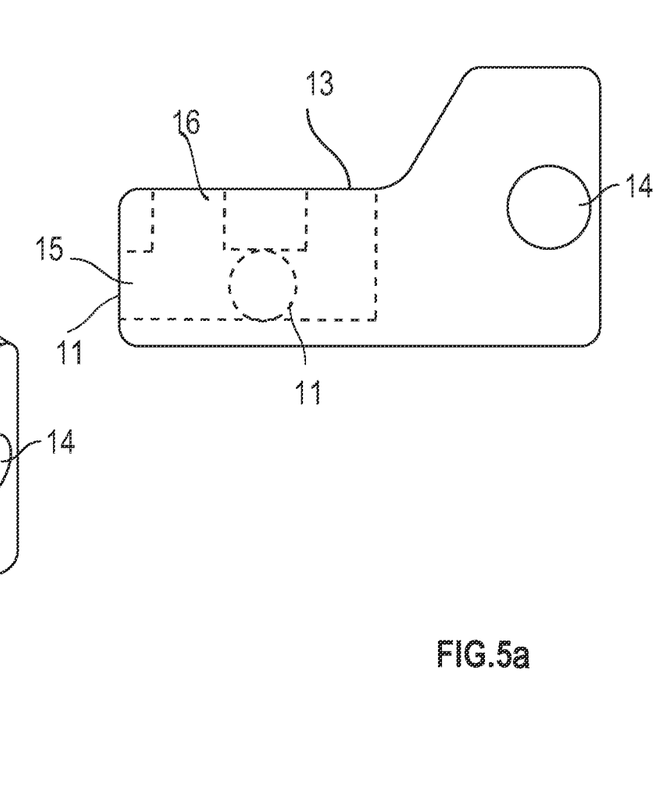
FIG. 5a is a top view of an embodiment of a first manifold.
Figure 5B:
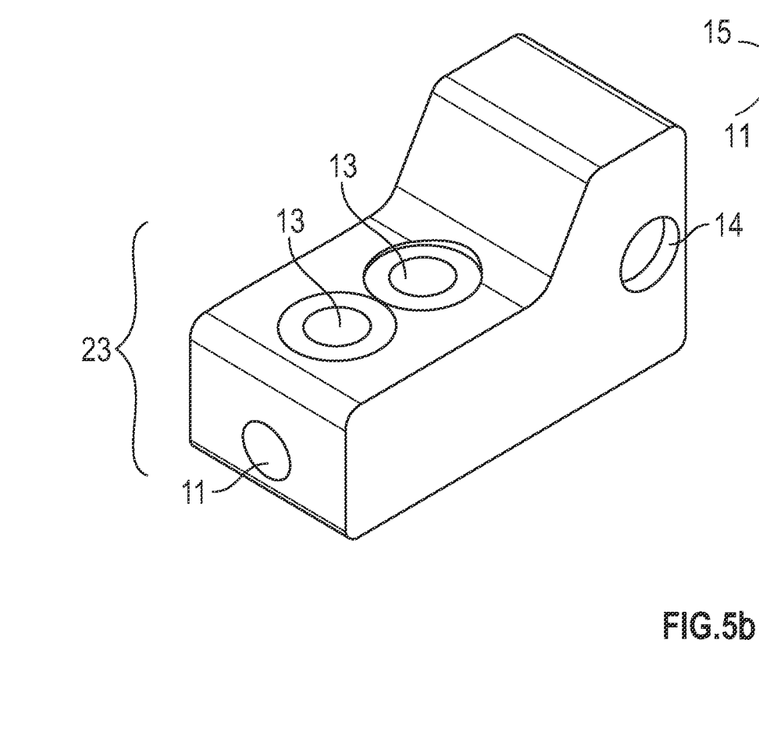
FIG. 5b is a side-perspective view of an embodiment of a first manifold.
Figure 6:
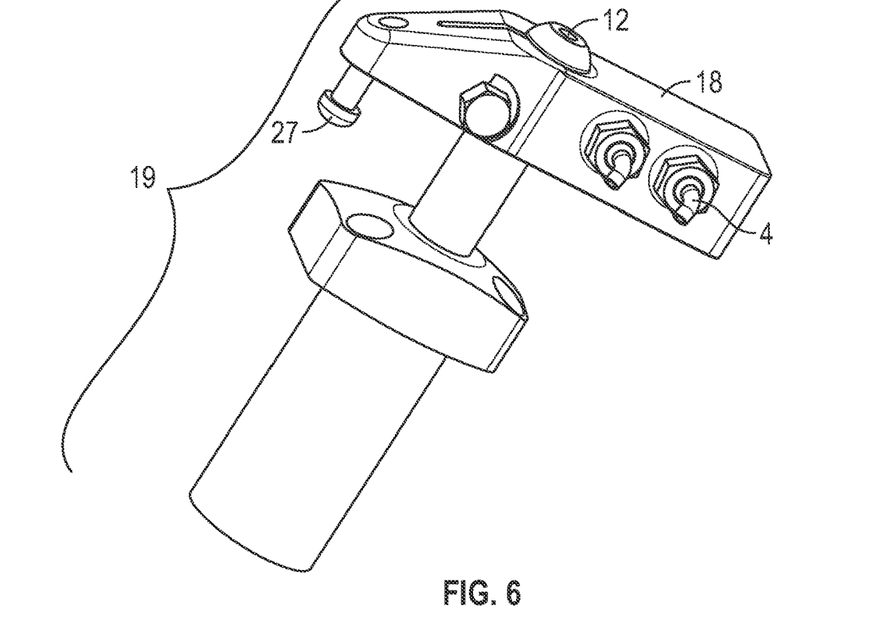
FIG. 6 is a side perspective view of an embodiment of an integrated clamp and manifold apparatus configured in an unclamped position.

The system may have a location to hold a workpiece 6 when the clamp 2 and manifold 3 apparatus 5 is in the clamped position as in FIG. 3, and to not engage a workpiece, wherein the clamp 2 and manifold 3 apparatus 5 of the system is unclamped as in FIG. 4. Thus, the clamp 2 and manifold 3 apparatus 5 and the integrated clamp and manifold apparatus 18, (as illustrated in FIG. 6), are capable of being configured in the unclamped position, as in FIG. 1 and FIG. 4, and in the clamped position, as in FIG. 2 and FIG. 3.

The apparatus 5 may further have internal fluid passages for flow of a fluid that may be used for the purposes of aiding in cutting, clearing chips from a cut point, cleaning a fixture, the clamp itself, or clamp or fixture surfaces, cleaning a clamped object or workpiece, for cooling the workpiece, tool, or work holding device, or applying a chemical, coating, spray, or adhesive to a workpiece.

The apparatus and system of one embodiment may have passages to contain and direct oils used in the art of powered or unpowered work holding clamps, machining, assembly, and fabrication and manufacturing processes. The clamp and manifold apparatus and system of another embodiment may have passages to contain and direct coolants used in the art of powered or unpowered work holding clamps, machining, assembly, and fabrication and manufacturing processes. The clamp and manifold apparatus and system of yet another embodiment may contain and direct gases used in the art of powered or unpowered work holding clamps, machining, assembly, and fabrication and manufacturing processes.

The apparatus and system may be configured for use with other working fluids such as coolant, compressed air, nitrogen, carbon dioxide, cutting oils, cutting fluids, other chemicals, glues, multipart epoxies, adhesives, coatings, sealants, paints, The clamp and manifold, whether integrated or connectable, of the system may further be integrated as one 18, such that the manifold's and clamp's internal passages are contiguous and continuous, in fluid communication with one another. That is, the passages of the manifold, for transporting a fluid can continue from the manifold through the clamp, closer to a ported clamp head such that the clamp head is mounted to the manifold, either permanently or is inextricably linked. "Inextricably linked" means the clamp and manifold of the system may be two separate parts that are inextricably connected such that the separate parts are indistinguishable and appear inseparable, or they comprise a single, continuous part.

The rotary, swing or pivot clamp, and manifold, whether integrated or connectable, each having passages or channels for fluid flow may be associated with a tool or machine or may be otherwise disassociated therewith. In one embodiment, the clamp and manifold apparatus, whether or not integrated, is envisioned to be disassociated from a drive mechanism of a tool or machine.

In all applications, the clamp and manifold apparatus may have any type of connection means known in the art to connect fluid systems, such as tubing, piping or other means to a port on the manifold body, whether an integrated clamp and manifold apparatus or a manifold that is connectable to the clamp head as described herein.

One embodiment of the clamp and manifold apparatus, whether integrated or connectable, comprises a clamp body, where such body may be made up of aluminum, steel, plastic, or other materials known in the art of powered or unpowered work holding clamps. Such an embodiment further includes an attachment feature 22 attaching to a fixture system on a first end of the body, such as at least one clamping surface or clamp contact 27 which is configured to contact a workpiece 6 in the fixture system with a spring, manual contact, or other compression or pressure application means known in the art of clamps. The clamp of this embodiment may also include a clamping surface 27 on a second end of the body, such as at least one clamping surface which is configured to contact a workpiece 6 or other object having a spring, hydraulic, pneumatic, manual, or other compression or pressure application means known in the art of clamps. In one such embodiment, the body of the clamp has at least one fluid flow passage inside the body having at least two endpoints. The clamp 2 and manifold 3 apparatus 5 of this embodiment has a first port configured to receive a fluid, where said port is disposed adjacent to the body of the clamp and meets contiguously and continuously with one endpoint of the at least one fluid flow passage inside the body. The clamp and manifold apparatus of this embodiment has a second port configured to discharge a fluid, said second port is disposed adjacent to the body and meets contiguously and continuously with the second endpoint of the at least one fluid flow passage inside the body.

One embodiment of the clamp and manifold apparatus, whether integrated or connectable, is configured for a fluid that is an oil used in the art of powered or unpowered work holding clamps, machining, assembly, fabrication and manufacturing.

One embodiment of the clamp and manifold apparatus, whether integrated or connectable, is configured for a fluid that is a glue used in the art of manufacturing.

One embodiment of the clamp and manifold apparatus, whether integrated or connectable, is configured for a fluid that is a coating used in the art of manufacturing.

Another embodiment of the clamp and manifold apparatus, whether integrated or connectable, is configured for a fluid that is a gas used in the art of machining or manufacturing.

An embodiment of the clamp and manifold apparatus, whether integrated or connectable, comprises a second port that is configured to discharge fluid in a manner unobstructed by an object clamped on the second end of the body. Specifically, the clamping surface on said second end of the clamp body is configured to be spaced from said second port. More specifically, said second end of the clamp body in at least one embodiment is spaced a distance along an uncommon surface such that said second port is on a different surface than the clamping surface.

It may be preferable for the clamping surface on the second end of the clamp body to be disposed at least 12 mm from the closest edge of the second port in order to reduce or eliminate obstruction by an object clamped by the clamping surface.

An embodiment of the clamp and manifold apparatus, whether integrated or connectable, comprises a second port that is configured to discharge a fluid through hands-free means. Hands-free means may include port fittings, nozzles, sprayers, or other like features known in the art of fluid disbursement. Other embodiments of the clamp and manifold apparatus, whether integrated or connectable, comprise a second port that is configured to discharge a fluid through assisted or manual means. Assisted or manual means may include hand-actuated sprayers, nozzles with actuators, or other like features known in the art of fluid disbursement.

Another embodiment of the clamp and manifold apparatus, whether integrated or connectable, comprises a manifold having a third port configured to discharge a fluid, which is a second discharge port in such embodiment and such port is positioned continuously and contiguously with a third endpoint of the internal fluid flow passage within the body.

In an embodiment of the clamp and manifold apparatus, whether integrated or connectable, the manifold is further configured to direct more than a majority of the working fluid in a predetermined direction. In another embodiment of the clamp and manifold apparatus, whether integrated or connectable, the manifold is further configured to direct substantially all of the working fluid in a predetermined direction.

In another embodiment of the clamp and manifold apparatus, whether integrated or connectable, the manifold is further configured to direct fluid in a direction capable of being manipulated by a user, such as though a hose, tube, pipe or other fluid routing means.

Figure 10:
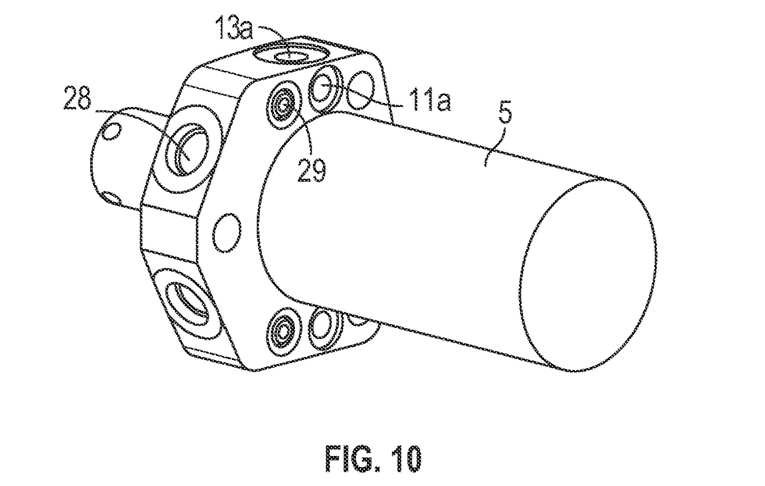
FIG. 10 is a side perspective view of an embodiment of a clamp body having a second manifold.
Figure 11:
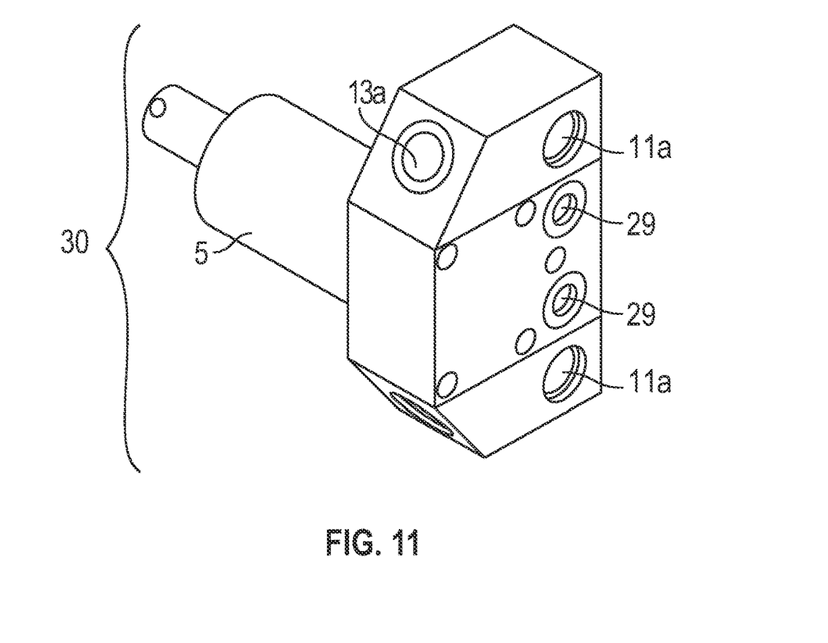
FIG. 11 is a side perspective view of an embodiment of a clamp body having a second manifold.

In an embodiment of the clamp and manifold apparatus, whether integrated or connectable, the apparatus having at least two ports 11a and 13a for passing a fluid through the clamp body of the apparatus 30, for at least one fluid. In one embodiment the additional porting for passing a fluid through the clamp body may be for a first fluid from a first input port 11a to a first output port 13a. In another embodiment, two additional ports 28, a dissociated output port, and 29, a dissociated input port, may be ports dissociated from the first output and first input ports, disposed on two separate surfaces, the ports configured for receiving and discharging a fluid for operating the clamp of the apparatus.

Figure 12:
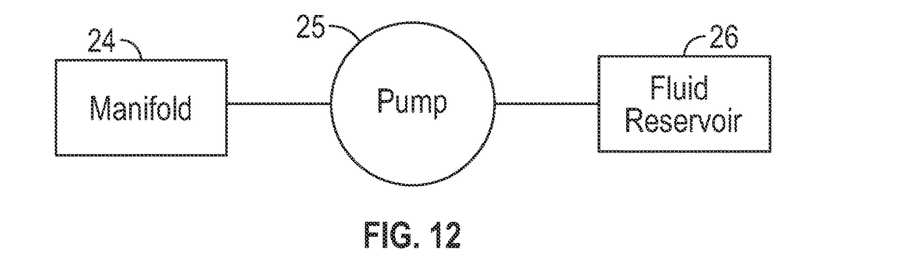
FIG. 12 is a layout of the system showing the serial connection.

In an embodiment of the system, the system comprises a clamp with a body; an attachment feature for attaching to a fixture system on a first end of the body; a clamping surface on a second end of the body; at least one fluid flow passage inside the manifold having at least two endpoints; a first port configured to receive a fluid, said port is disposed adjacent to the manifold that meets contiguously and continuously with one endpoint of the at least one fluid flow passage inside the manifold; and, a second port configured to discharge a fluid, said second port is disposed adjacent to the body and meets contiguously and continuously with the second endpoint of the at least one fluid flow passage inside the manifold. Such embodiment of the system further comprises a fixture apparatus, sometimes referred to as a nest, where such fixture apparatus may be further comprised of multiple structural and fastener components known in the art of industrial processes of assembly, machining, or manufacturing. As illustrated in FIG. 12, the embodiment may further include a fluid distribution pump 25 and fluid routing means connecting the fluid distribution pump 25 and the first port of the clamp of the system. Such means may include tubing, piping, conduits, or other fluid transport components known in the art of transporting fluids in industrial, machining, and manufacturing systems. The embodiment may further include a fluid reservoir or storage tank 26 connected in series with the fluid distribution pump by fluid routing means.

Another embodiment of the system further comprises a manifold, whether integrated or connectable, having at least one internal flow passage where said manifold is connected on a first end to the fluid distribution pump by fluid routing means, and is connected on a second end to the first port of the clamp body. Such connection may be continuous, such that the manifold and clamp are inextricably linked, are removably connected, or otherwise connected by means for connecting mechanical components.

In at least one embodiment of the system is further configured to direct more than a majority of the working fluid in a desired, predetermined direction. In yet another embodiment, the system is configured to direct more than a majority of the working fluid in a direction capable of being manipulated by a user with moveable fluid routing means such as a hose, tube, piping or others.

In at least one embodiment of the system is further configured to direct substantially all of the working fluid in a desired, predetermined direction. In yet another embodiment is configured to direct substantially all of working fluid in a direction capable of being manipulated by a user with moveable fluid routing means such as a hose, tube, piping or others.

Figure 7:
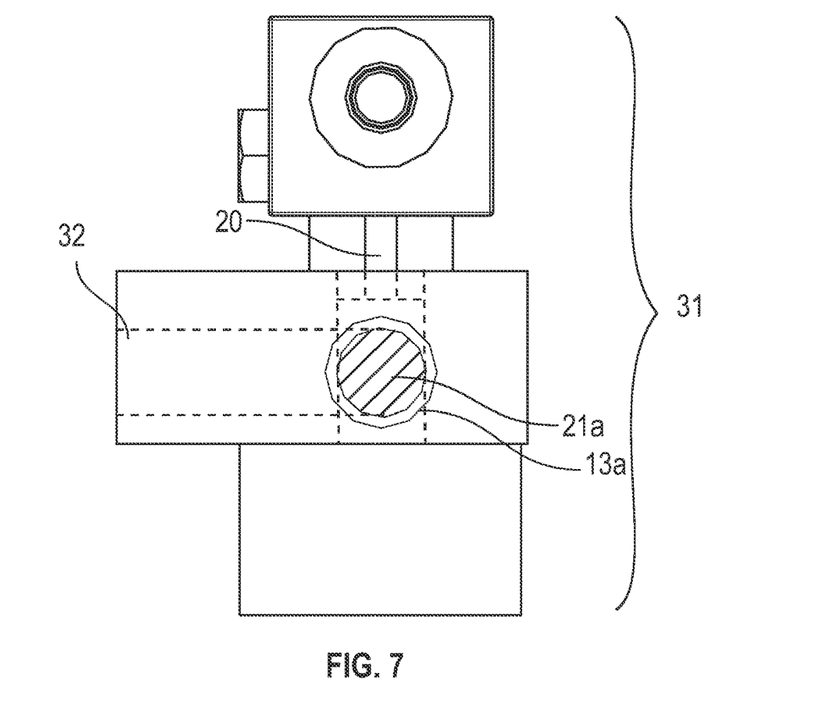
FIG. 7 is a side view of an embodiment of an embodiment of a clamp head and manifold apparatus in a clamped position wherein the working fluid of the system of an embodiment is associated with the clamp actuation and operation such that the fluid of the embodiment is constrained thereby.
Figure 8:
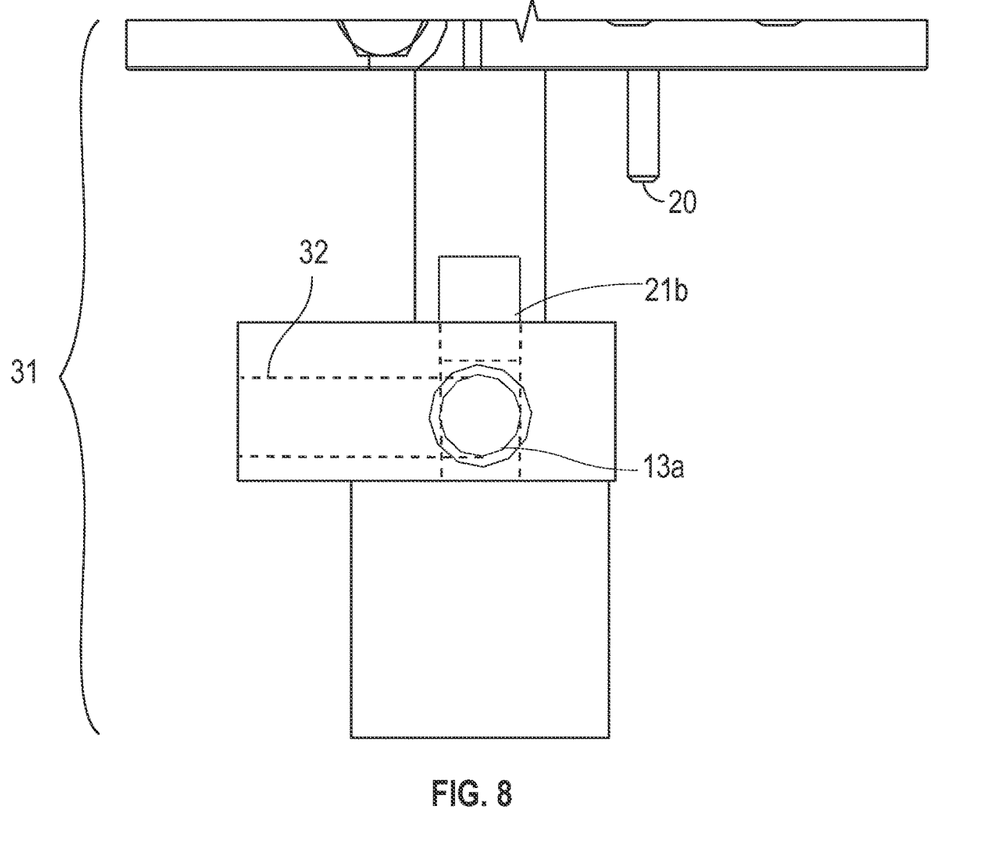
FIG. 8 is a side view of an embodiment of a clamp head and manifold apparatus in an unclamped position wherein the working fluid of the system of an embodiment is associated with the clamp actuation and operation such that the fluid of the embodiment is constrained thereby.
Figure 9:
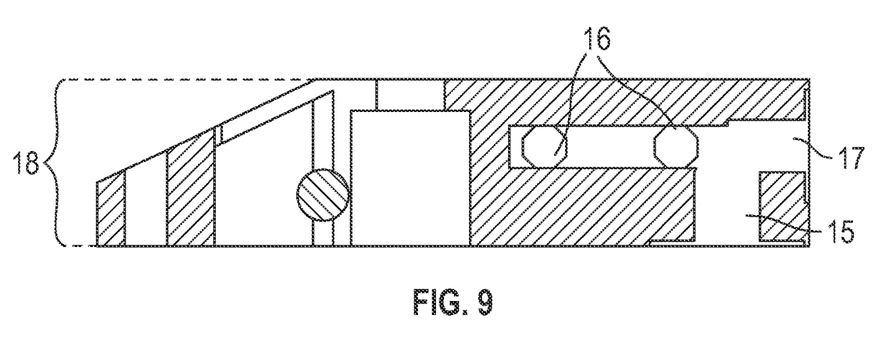
FIG. 9 is a side section view of an embodiment of an integrated clamp and manifold apparatus.

In at least one embodiment of the system, the working fluid of the system is disassociated from the clamp actuation and operation, and not constrained by operation of the clamping function. In an embodiment where the working fluid of the system is associated with the clamp actuation and operation, the clamp body 30 comprises at least one plunger actuator 20 and at least one valve plunger 21a and 21b integral to the clamp and manifold apparatus. In one embodiment, as shown in FIGS. 7 and 8, a plunger actuator 20 may extend from the clamp head, but it may be, in other embodiments, attached to a connected manifold 3, an integrated clamp and manifold of the apparatus, or to the clamp body 30 of the apparatus. In one embodiment, as shown in FIGS. 7 and 8, a valve plunger 21a and 21b may be integral to the clamp body having additional passages 32 and ports 11a and 13a, but it may be, in other embodiments, integral to a connected manifold 3, an integrated clamp and manifold 18 of the apparatus, or a clamp head 2. Shown in FIGS. 7 and 8, the valve plunger 21a and 21b in this embodiment is configured to interact with the plunger actuator 20. In one such embodiment of the valve plunger 21a and 21b and the plunger actuator 20, the two are configured such that when the clamp is in the unclamped position, the plunger actuator 20, being a mechanical feature disposed adjacent to the outer surface of the apparatus in this embodiment, is not in contact with the plunger 21b, and when the clamp is in the clamped position the plunger actuator is in contact with the plunger 21a. In other embodiments of the clamp and manifold apparatus, the plunger actuator 20 and valve plunger 21a and 21b may be configured to be actuated by other means, disposed integral to the clamp body of the apparatus, where the plunger actuator 20 may be driven by the internal operating features of the clamp through pressure means such as pneumatic, hydraulic, spring actuated, or other means known in the art of internal clamp body pressure application.

In the above referenced embodiment the apparatus, including the valve plunger 21a and 21b and plunger actuator 20, the apparatus may be configured such that during operation the clamp allows for opening and closing a fluid flow passage of the apparatus, for fluid to flow when the apparatus is connected to fluid routing means and used with a working fluid of the system.

The invention contemplates the reduction in cost of productions and efficiency improvements in machining and manufacturing processes, including clamp and manifold apparatus and system design.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

As such, those skilled in the art will appreciate that the conception upon which this disclosure is based may readily be utilized as a basis for the designing of other structures, methods and systems for carrying out the several purposes of the presented embodiment. It is important, therefore, that the description be regarded as including such equivalent constructions insofar as they do not depart from the spirit and scope of the presented embodiments.

What is claimed is:

1. A clamp head and manifold apparatus, comprising:
   a clamp head configured to be disposed on a first distal end of at least one of a rotatable and a translatable clamping actuator, the clamp head including a clamping surface configured to retain a workpiece under control of the clamping actuator; and
   a first manifold configured to be disposed on the first distal end of the clamping actuator proximate the clamp head and including at least one fluid flow passage therein, the at least one fluid flow passage including,
      an input port configured to receive a fluid for communication with the at least one fluid flow passage, and
      an output port configured to discharge the fluid from the at least one fluid flow passage in a direction toward at least one of the clamp head and the workpiece configured to be retained by the clamp head.

2. The clamp head and manifold apparatus as in claim 1, wherein the clamp head and manifold apparatus is configured for an oil to be used as the fluid.

3. The clamp head and manifold apparatus as in claim 1, wherein the clamp head and manifold apparatus is configured for a gas to be used as the fluid.

4. The clamp head and manifold apparatus as in claim 1, wherein the output port is configured to discharge the fluid void of an obstruction by the workpiece retained by the clamp head.

5. The clamp head and manifold apparatus as in claim 1, wherein the output port is configured to discharge the fluid through hands-free means.

6. The clamp head and manifold apparatus as in claim 1, wherein the first manifold further comprises a third output port configured to discharge the fluid in a second direction relative to the discharge direction of the output port.

7. The clamp head and manifold apparatus as in claim 1, wherein the discharge of fluid from the output port is not constrained by a clamping operation of the workpiece retained by the clamp head.

8. The clamp head and manifold apparatus as in claim 1, wherein the discharge of the fluid from the output port is constrained by the clamping operation of the clamp head with the workpiece.

9. The clamp head and manifold apparatus as in claim 1, further configured to move between a clamped position and an unclamped position.

10. The clamp head and manifold apparatus as in claim 1, further comprising a second manifold comprising at least two ports and one internal fluid passage configured to connect a fluid routing means for at least one fluid used with the first manifold.

11. The clamp head and manifold apparatus as in claim 1, wherein the clamp head and first manifold are contiguous and configured to form one unitary part.

12. The clamp head and manifold apparatus as in claim 1, further comprises at least one plunger actuator and at least one valve plunger.

13. A clamp fixture system, the system comprising:
   a clamp head and manifold apparatus comprising:
      a clamp head disposed on a first distal end of a rotatable and translatable clamping actuator, the clamp head including a clamping surface configured to retain a workpiece under control of the clamping actuator;
      a first manifold disposed on the first distal end of the clamping actuator proximate the clamp head and including at least one fluid flow passage therein, the at least one fluid flow passage including,
         an input port configured to receive a fluid for communication with the at least one fluid flow passage, and
         an output port configured to discharge the fluid from the at least one fluid flow passage in a direction toward at least one of the clamp head and the workpiece configured to be retained by the clamp head;
   a fixture apparatus configured to retain a working piece with the clamping surface of the clamp head; and
   fluid routing means configured to supply the fluid to the input port.

14. The clamp fixture system as in claim 13, further comprising a second manifold having at least one internal flow passage where the second manifold is connected to the input port.

15. The clamp fixture system as in claim 13, wherein the discharge of fluid is further configured to be free from a retention operation of the clamp head retaining the workpiece.

16. The clamp fixture system as in claim 13, wherein the fluid is disassociated from actuation and operation of the clamp head such that the fluid is not integral to operation of the clamp head retaining the workpiece.

17. The clamp fixture system as in claim 13, wherein the fluid is disassociated from actuation and operation of the clamp head and the first manifold such that the clamp head and manifold apparatus is operable between a clamped configuration and an unclamped configuration independent of operation of the fluid.

18. A clamp fixture system as in claim 13, wherein the fluid is associated with the actuation of the clamp head and manifold apparatus such that the clamp head and manifold apparatus further comprises at least one valve plunger and one valve actuator and is configurable between a clamped configuration and an unclamped configuration where the fluid is constrained by the at least one valve plunger in operation of the clamp head and manifold apparatus.

19. The clamp fixture system as in claim 13, wherein the first manifold and the clamp head are contiguous, configured to form one unitary part.

20. The clamp fixture system as in claim 13, the system further comprising a second manifold comprising at least two ports and one internal fluid passage connected to the first manifold.

* * * * *